(12) United States Patent
Khalil et al.

(10) Patent No.: US 6,847,756 B2
(45) Date of Patent: Jan. 25, 2005

(54) OPTICAL SWITCHING MATRIX AND METHOD OF FABRICATING SUCH A MATRIX

(75) Inventors: Diaa Khalil, Le Caire (EG); Kareem Madkour, Le Caire (EG); Bassam Saadany, Le Caire (EG); Tarek Badreldin, Le Caire (EG); Philippe Helin, Grenoble (FR)

(73) Assignee: MEMSCAP, Bernin (FR)

( * ) Notice: Subject to any disclaimer, the term of this patent is extended or adjusted under 35 U.S.C. 154(b) by 126 days.

(21) Appl. No.: 10/391,336

(22) Filed: Mar. 18, 2003

(65) Prior Publication Data

US 2003/0194172 A1 Oct. 16, 2003

(30) Foreign Application Priority Data

Apr. 11, 2002 (FR) ............................................ 02 04512

(51) Int. Cl.[7] ................................................ E02B 6/35
(52) U.S. Cl. .......................................... 385/18; 385/17
(58) Field of Search .............................. 383/18, 17, 49, 383/14

(56) References Cited

U.S. PATENT DOCUMENTS 4,932,745 A * 6/1990 Blonder ....................... 385/18
6,404,942 B1 * 6/2002 Edwards et al. ............... 385/18
6,587,626 B2 * 7/2003 Beguin et al. ............... 385/125
2002/0034372 A1 * 3/2002 Alibert et al. ............... 385/147
2002/0044720 A1 * 4/2002 Brophy et al. ................. 385/17
2003/0223676 A1 * 12/2003 Bernstein ...................... 385/18

FOREIGN PATENT DOCUMENTS

| EP | 1 136 851 A | | 9/2001 | |
| EP | 1 191 373 A | | 3/2002 | |
| JP | 04 216291 | * | 8/1992 | ............ H04Q/3/52 |
| WO | WO 02/05012 A2 | | 1/2002 | |

* cited by examiner

Primary Examiner—Brian Healy
Assistant Examiner—James P. Hughes
(74) Attorney, Agent, or Firm—Burr & Brown (57) ABSTRACT

An optical switching matrix, including optical input fibers (12) and optical output fibers (14) oriented substantially perpendicular to each other, moveable mirrors (5, 13) placed at the intersections of the directions defined by the various optical fibers, each mirror (13) being capable of moving in order to reflect a beam coming from an optical input fiber, bound for an optical output fiber, and a set of channels defined between the mirrors, inside which the various beams are propagated before and after having encountered the mirrors. The set of mirrors are made on a first substrate wafer (2) that is covered with a second substrate wafer (20), and the various channels (38) are formed between protruding zones (34) present under the second substrate wafers. The protruding zones include housings (33) inside which the moveable mirrors are able to move.

7 Claims, 7 Drawing Sheets

OPTICAL SWITCHING MATRIX AND METHOD OF FABRICATING SUCH A MATRIX

This application claims the benefit of French Application 02 04512, filed Apr. 11, 2002, the entirety of which is incorporated herein by reference.

TECHNICAL FIELD

The invention relates to the field of microelectronics applied to telecommunications by optical means. More specifically, it relates to microelectromechanical optical components providing switching functions, commonly known as "switches", commonly known as "switches". More specifically, the invention is aimed at the structure of a component including a matrix of such a switch, making it possible to provide the configurable link between various optical fibers. The aim of the invention is to improve the optical behavior of such components, such as optical cross connects (OXC) or add/drop multiplexers (ADM), especially with regard to insertion loss phenomena.

PRIOR ART

In general, an optical switching matrix, or optical cross connect (OXC), comprises a set of optical input fibers and a set of optical output fibers which are placed perpendicularly. Each of these two sets of optical fibers is placed on two adjacent sides of a rectangular zone, which brings together a plurality of reflecting structures. Each reflecting structure or mirror is oriented so that it can reflect the light beam coming from an optical input fiber to an optical output fiber. Each of these reflecting structures can be moved individually so that it does or does not provide this reflection. It is thus possible to provide the link between any optical input fiber and any optical output fiber.

Some switching matrices also comprise a second set of optical input fibers and a second set of optical output fibers placed on the other two sides of the rectangular zone of the matrix. The second set of input fibers is aligned with the first set of output fibers and, in a complementary manner, the second set of output fibers in direct alignment with the first set of input fibers. By acting in a suitable manner on the various reflective structures, which are reflective on both of their faces, the number of links which can be established or cut by the optical component is increased, thus carrying out functions generally described as "add-drop" functions.

In general, when the beams coming from the optical fibers are propagated within the component, losses described as "insertion losses", which depend on many parameters, are observed. In particular, these losses may depend on the length of the optical path traveled by the beams, which varies within the switching matrix. These losses also depend on the reflection coefficient of the mirror encountered by the beam. Now, from one mirror to another, within the matrix, this reflection coefficient may vary slightly, such that the losses are not uniform from one beam to another.

Similarly, the insertion losses may result from a slight defect in alignment of the fibers with respect to the mirror, or else of the mirror with respect to the theoretical directions of the beams. These losses may also arise from too great a divergence of the beams due to non-optimal collimation.

To try to decrease the insertion losses, document WO/05012 proposed equipping the switching matrix with a set of waveguides, placed between the various mirrors. More specifically, these waveguides are made under the plane on which the reflecting structures rest. When the mirror, or reflecting structures are moved, the beams reaching them are reflected at the lower level, inside the waveguides in question. The beam is then propagated inside this waveguide to the output fibers, which are located below the plane of the input fibers. It is understood that this architecture has many drawbacks, since it differentiates between the positions of the input fibers and of the output fibers, which are located at different levels. Furthermore, the production of such a structure is particularly complex, since it requires a large number of mask levels.

Finally and above all, because of the high angle at which the reflected beams enter the waveguides, the number of reflections within the waveguide is particularly high, inevitably with significant losses. It will also be noted that the metal coating of the waveguide is a source of losses which depend on the polarization of the beam. This type of loss, commonly called PDL for "polarization-dependent loss", may therefore be prohibitive for some applications.

Other solutions have been proposed in documents US 2002/034372 and US 2001/024556, which consist in placing waveguides between the reflecting structures. These waveguides are made from a material which has a refractive index greater than that of the surrounding environment, which may be air or a liquid, so as to force the beams to be reflected inside the waveguide rather than be transmitted to the surrounding environment. The major drawback of these solutions resides in the fact that these waveguides are of course broken close to the reflecting structures, in order to allow them to move freely. Consequently, there are interfaces between the waveguide and the surrounding environment. These interfaces form the basis for reflection phenomena which are the source of propagation losses. These losses are even greater where the matrix has a high number of reflecting structures, and therefore of interfaces between waveguides and the surrounding environment.

One problem that the invention proposes to solve is that of reducing or, more specifically, standardizing the insertion losses for the various beams propagating within one and the same matrix. A second problem that the invention seeks to solve is that of compensating for some alignment defects of the various fibers, or some defects in the construction of the switching matrix. One objective of the invention is to make it possible to solve these various problems without making the method of fabricating the component more complex.

SUMMARY OF THE INVENTION

The invention therefore relates to an optical switching matrix, made from a semiconductor- or dielectric-based substrate. Such a matrix comprises, in a known manner, at least one set of input fibers and at least one set of optical output fibers oriented substantially perpendicular to each other. Such a matrix also comprises a set of moveable mirrors placed at the intersections of the directions defined by the various optical fibers, each mirror being capable of moving in order to reflect a beam coming from an optical input fiber, bound for an optical output fiber. The matrix also comprises a set of channels defined between the mirrors, inside which the various beams are propagated before and after having encountered the mirrors.

According to the invention, this switching matrix is distinguished in that the set of mirrors is made on a first substrate wafer, this wafer being covered with a second substrate wafer forming a lid. The various channels are formed between protruding zones present under the second substrate wafer. These protruding zones comprise housings inside which the moveable mirrors are able to move.

In other words, most of the spaces defined between the mirrors are filled by zones forming protuberances under the wafer forming the lid of the matrix. These protruding zones comprise channels within which the beams bound for the mirror, or coming from a mirror, are propagated. Thus, most of the optical path traveled by the beam within the matrix is inside the channels, which are completely continuous, with no transition between different materials. These channels act as waveguides which in some way are "inverted", since they have a refractive index less than that of the surrounding environment. Inside this waveguide, the beam is reflected on the walls of the channels. Surprisingly, although the beams are partially reflected on the substrate forming the walls of the channels, a loss rate which is low is observed within the waveguide, and this therefore gives an overall advantage with respect to the components not having waveguides. Indeed, the fact that the cladding of the channel is made from substrate, and typically from silicon whose refractive index is 3.5, could lead one to think that the insertion losses would be high. However, since the beam is on the whole collimated, the angles of incidence of the beams propagating in the waveguides with respect to the walls thereof are relatively small, which therefore causes a loss rate which is, surprisingly, particularly, low.

In a particular embodiment, the wall of the channels furthest from the second substrate wafer forming the lid is made by a third substrate wafer. This third wafer is open in the zones receiving the mirrors, to allow the latter to pass through.

In practice, the channels may have a rectangular cross section, which preferably may be square. The channels may also adopt other cross sections, such as trapezoidal, triangular or even circular, depending on the method of producing them.

Advantageously, in practice, the optical fibers and the associated collimating members are inserted in housings which are partly formed in the first and the second substrate wafer. In other words, the second substrate wafer forming the lid has grooves in which part of the circumference of the optical fibers is housed.

The invention also relates to a fabrication method making it possible to produce such a switching matrix.

According to the invention, this method comprises several steps consisting:
on a first substrate wafer, in producing the set of moveable mirrors,
on a second substrate wafer, designed to cover the first wafer, in defining an overthickness zone, of dimensions substantially less than those of the matrix of moveable mirrors,
in producing on said overthickness zone:
  a set of channels at the locations of the beams coming from and bound for the optical fibers,
  a set of diagonal grooves at the locations of the moveable mirrors,
in covering the second wafer with a third wafer, so as to close said channels defined on the overthickness zone,
in producing apertures in the third wafer in order to open out the diagonal grooves formed in the overthickness zone,
in covering the first wafer with the assembly formed by the second and the third wafer, such that, between the mirrors, the beams coming from and bound for the optical fibers are routed in the channels defined in the overthickness zone and that the mirrors are capable of entering the housings defined by the diagonal grooves.

In other words, the component is made from several substrate wafers. The first wafer comprises the set of moveable mirrors, or more generally of reflecting structures. These reflecting structures are associated with some deformable portions and with the actuators, within a structure forming a frame providing a degree of rigidity to the assembly. The set of waveguides is made under the substrate wafer which acts as a lid for the matrix. The waveguides are made in such a way that, when the lid is put in place on the mirror matrix, these waveguides are located exactly between the mirrors without mechanically interfering with the portions for connecting the mirrors to the rest of the substrate. As such, the space between the mirrors may be occupied in an optimized manner, with a path outside the waveguides which is extremely limited.

In practice, it is preferred that, prior to the production of the overthickness zone on the second wafer, grooves intended to form part of the housing receiving the optical fibers are defined on the second wafer, on the periphery of the overthickness zone. As such, when the lid is put in place on the mirror matrix, the portions of optical fibers which overstep the upper plane enter these characteristic grooves.

Advantageously, in practice, in order to form the third wafer, which closes the channels of the waveguides, it is possible to use a substrate which is thick enough for it to be handled. The thickness of this third wafer can then be decreased after being put in place.

BRIEF DESCRIPTION OF THE FIGURES

The manner of implementing the invention, and the advantages which result therefrom, will become clearly apparent from the description of the following embodiment, with the support of the appended figures in which.

Of course, the dimensions of the elements shown in the figures have been chosen to allow the invention to be better understood, and may diverge from the dimensions of the actual elements.

IMPLEMENTATION OF THE INVENTION

Figure 1:
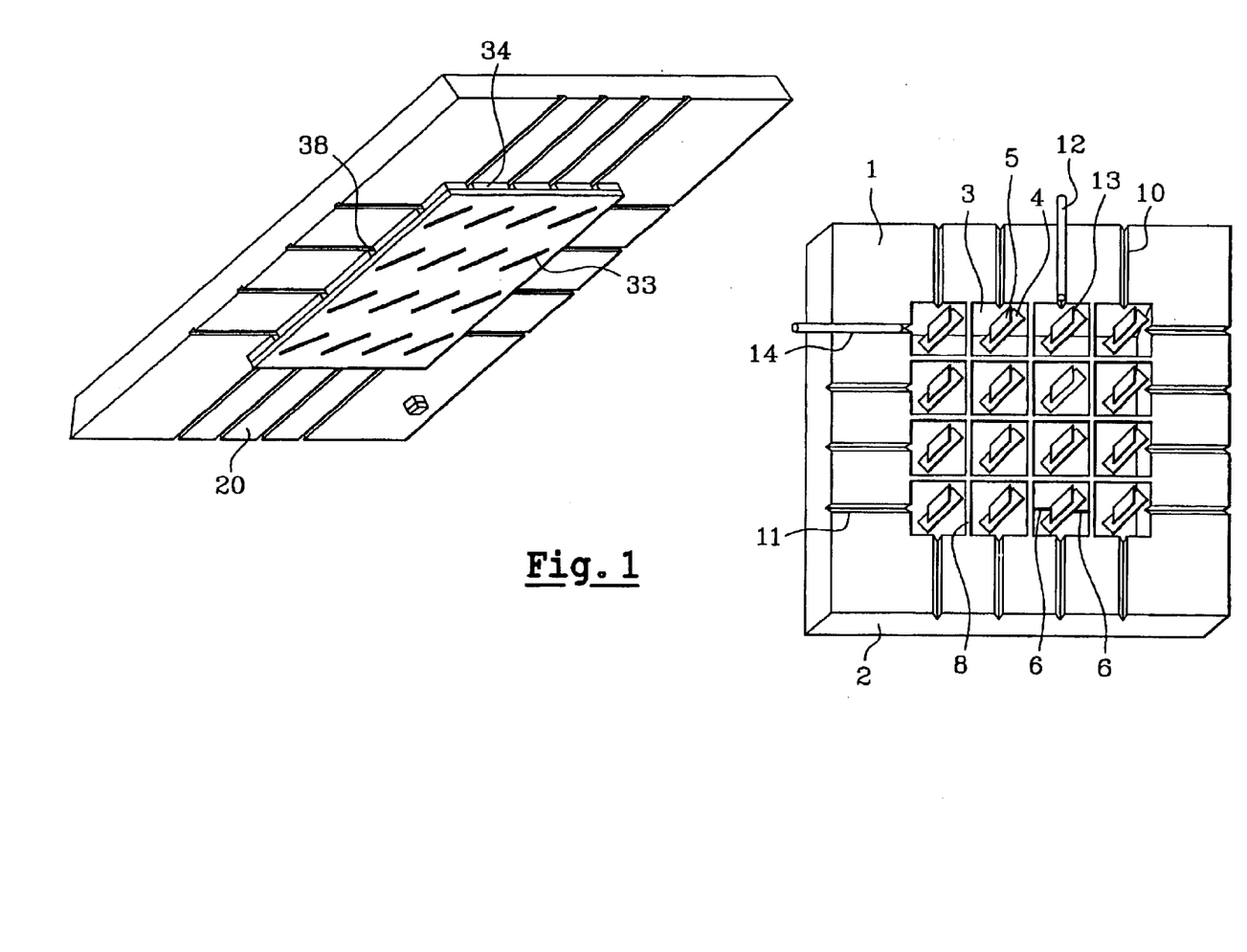
FIG. 1 is a summary perspective view of a switching matrix, shown before the characteristic waveguides are put in place.

As already stated, the invention relates to an optical switching matrix whose active element is illustrated in FIG. 1.

Such an element (1) is made from a substrate wafer (2) which may typically be of silicon, silicon-on-insulator (SOI) or, more generally, any type of substrate which can be etched by the methods known in the field of fabricating microelectromechanical systems (MEMS).

This element (1) comprises a matrix of cells (3), each one forming a unit switch. Each cell comprises a moveable part (4) on which a reflecting structure (5), forming a mirror, is mounted. This moveable structure, can be moved by means of an actuator (not shown) in order to be moved perpendicular to the main plane of the substrate. Connection portions (6), illustrated schematically in FIG. 1, make it possible to move the moveable part (4) with respect to a frame (8) formed by the various portions located between each cell (3).

The element (1) also comprises a number of grooves (10), whose cross section is in the shape of a V, such that these grooves are commonly called "V-grooves". These grooves (10) are designed to accommodate the various optical fibers. Conventionally, the set of input fibers is placed on one side of the square forming the matrix, while the output fibers are placed on the adjacent side. As such, the beams coming from one fiber (12) are propagated to the output fiber (14) after reflection on the mirror (13).

Of course, the invention also covers different types of switches, carrying out functions commonly described as "add/drop multiplexing". In this case, these switches require the presence of a second set of optical output fibers, located on the side opposite the first set of input fibers, and a second set of input fibers in direct alignment with the first set of optical output fibers.

According to the invention, the space located between the various mirrors (5, 13) is taken up by the characteristic waveguides, present under the element (20) illustrated in FIG. 1, and produced as explained hereinbelow.

Figure 2:
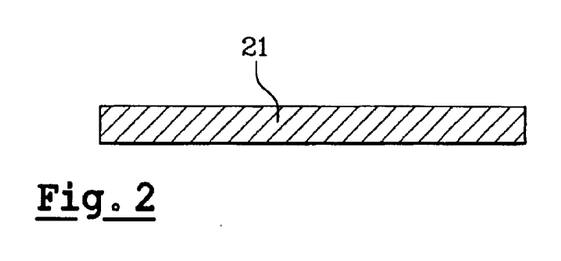
FIGS. 2 to 7 are schematic sectional views showing the various steps in producing the structure comprising the waveguides, before it is put in place on the mirror matrix.
Figure 3:
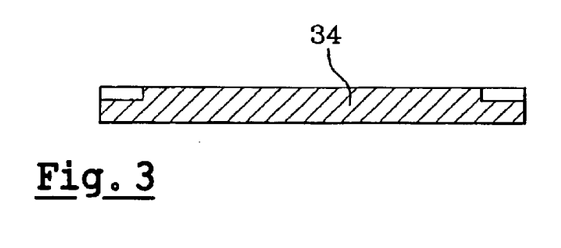
Figure 8:
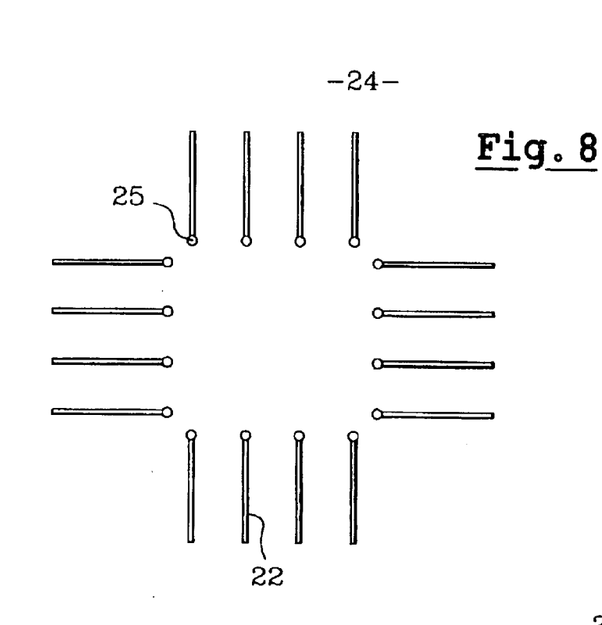
FIG. 8 illustrates the etching mask used to obtain the structure illustrated in summary perspective in FIG. 9.
Figure 9:
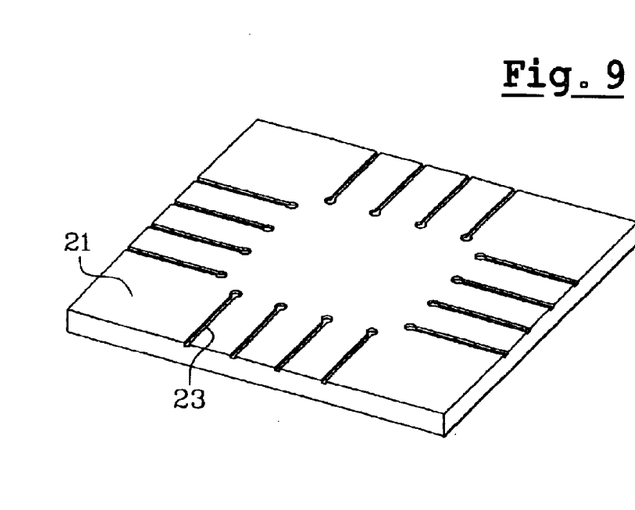

Thus, the lid (20) illustrated in FIG. 1 is made as illustrated schematically in FIG. 2 from a semiconductor wafer, typically made of silicon. This wafer (21) undergoes steps of "deep reactive ion etching" (DRIE) on the mask illustrated in FIG. 8. This mask defines patterns (22) which allow it to produce grooves (23) as illustrated in FIG. 9. The mask (24) also comprises patterns (25) making it possible to define the locations of the collimating members located at the end of the optical fibers. Typically, for an application in which the optical fibers have a diameter of 125 microns, the etching carried out using the mask (24) has a depth of about 23 microns.

Figure 4:
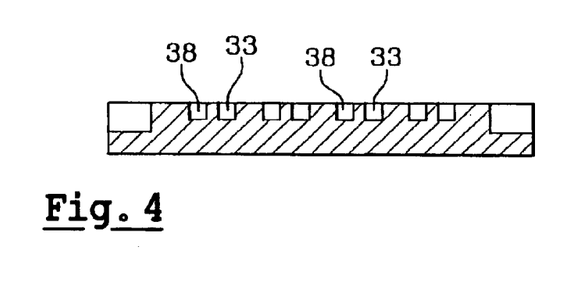
Figures 10, 11:
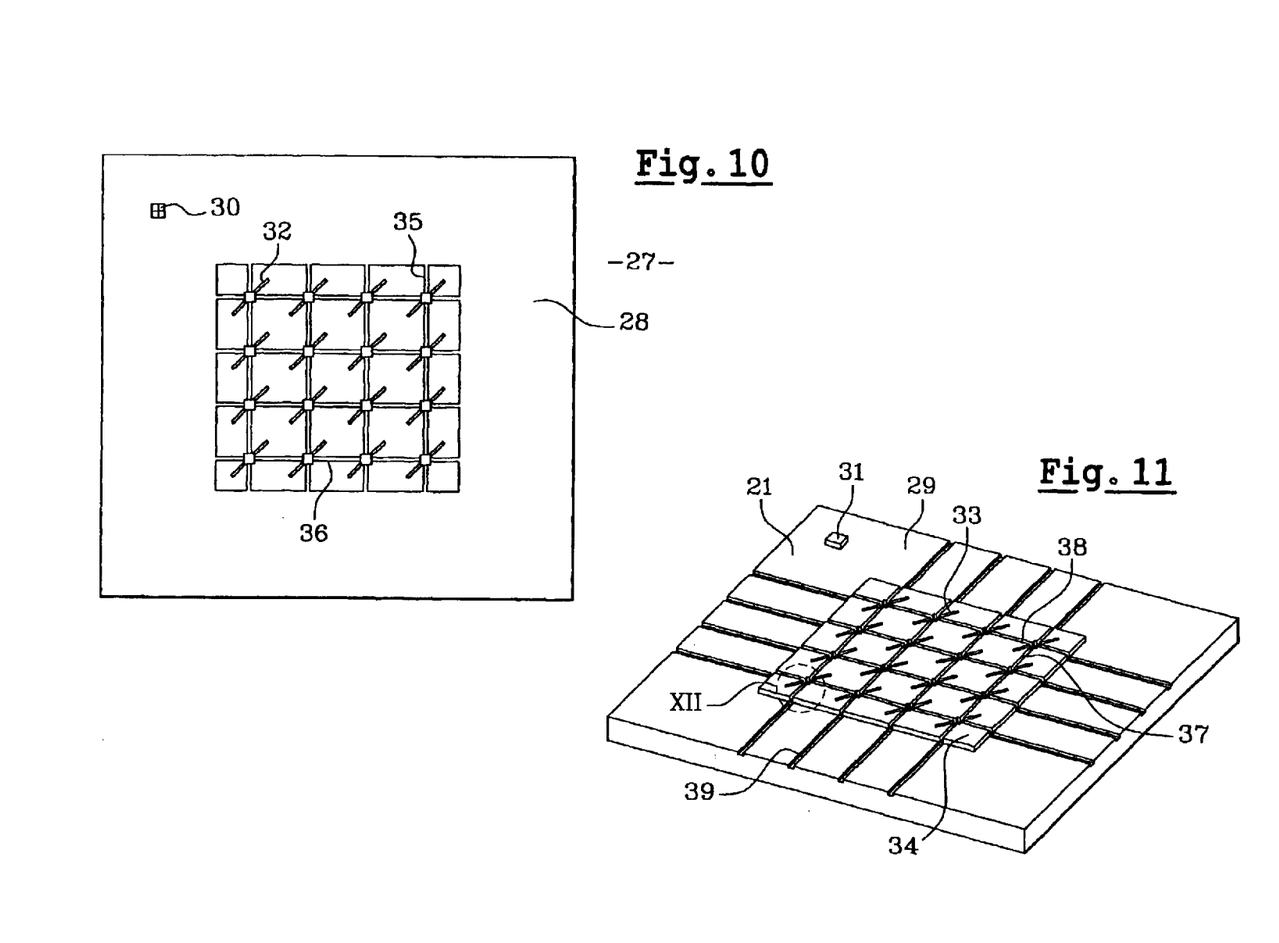
FIG. 10 illustrates the etching mask used to obtain the structure illustrated in summary perspective in FIG. 11.

Next, and as illustrated in FIG. 4, a new deep etching step is carried out, by means of the mask (27) illustrated in FIG. 10. This mask (27) comprises a peripheral zone (28) making it possible to etch the periphery (29) of the wafer (21). This mask also has a pattern (30) making it possible to generate an alignment pad (31) on the wafer (21).

According to the invention, the mask (27) also comprises patterns (32) corresponding to the locations of the mirrors (5, 13) of the switching matrix. These diagonal patterns therefore make it possible to produce diagonal grooves (33) on the protruding zone (34) formed on the wafer (21).

According to another feature of the invention, the mask (27) also comprises patterns (35, 36) making it possible to produce the channels (37, 38) illustrated in FIG. 11. These channels (37, 38), as illustrated in FIG. 4, will define the future characteristic waveguides.

In FIG. 4, portions of grooves (33), in which the end zones of the reflecting structures (5, 13) will subsequently be placed, can also be observed.

Figure 5:
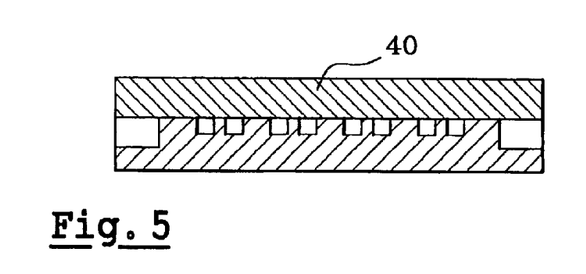
Figure 12:
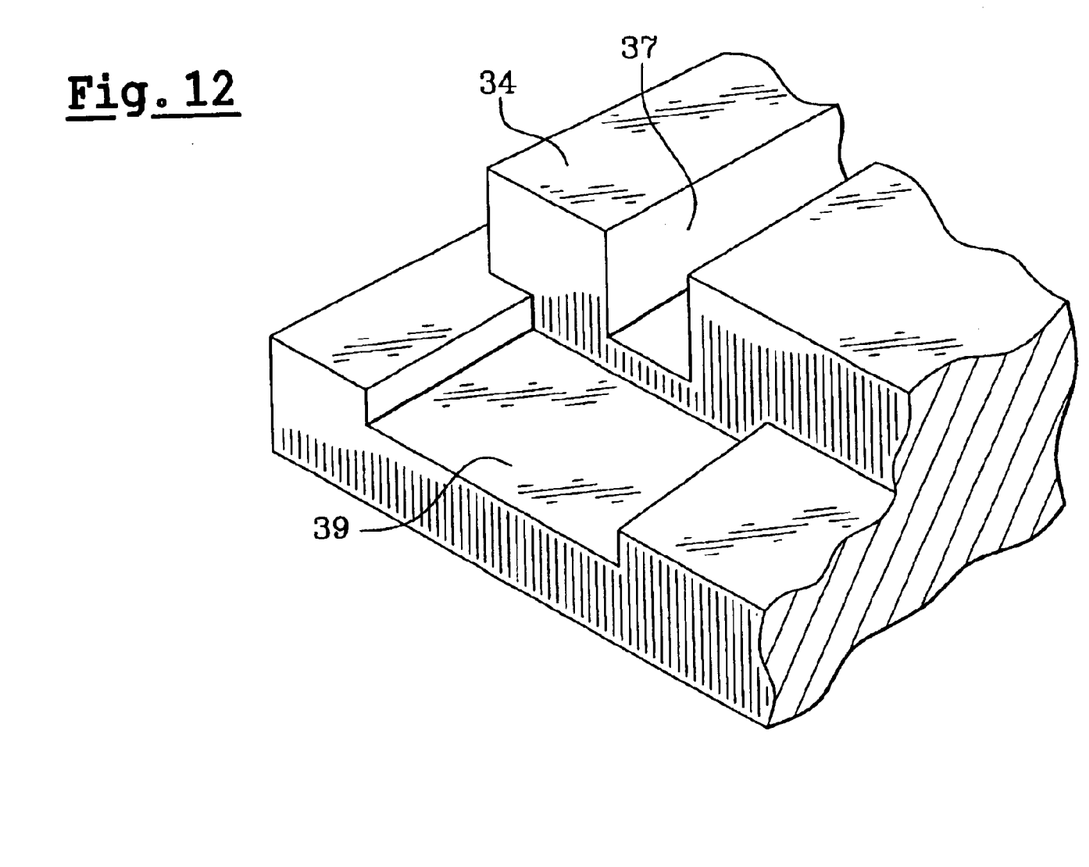
FIG. 12 is a detailed view in summary perspective of the zone (XII) of FIG. 11.

This etching step, over a depth of about 80 microns, also makes it possible to preserve the grooves (39), corresponding to the grooves (23) made during the previous etching step. As illustrated in FIG. 12, the bottom of the channel (37) and the bottom of the groove (39) are offset with respect to the substrate plane by the depth of the first etching step, that is typically 23 microns for the aforementioned application. Next, a third wafer (40) is deposited on top of the face to be etched of the second wafer (21), as illustrated in FIG. 5. This third wafer is put in place by means of conventional techniques according to operations commonly called "wafer bonding" operations. This wafer (40) may also be made from silicon, or more generally from a semiconductor which may be identical to or different from the material used to produce the second wafer (21).

Figure 6:
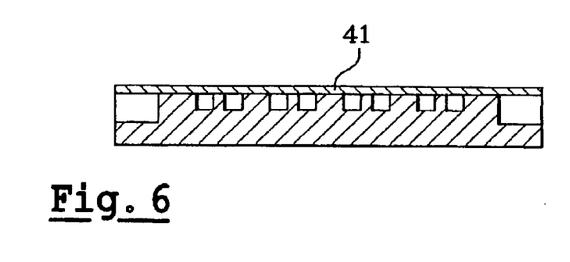

Next, and as illustrated in FIG. 6, the third wafer (40) is subject to an etching step intended to reduce its thickness. At the end of this operation, the third wafer (41) has a thickness of about 200 microns.

Figure 7:
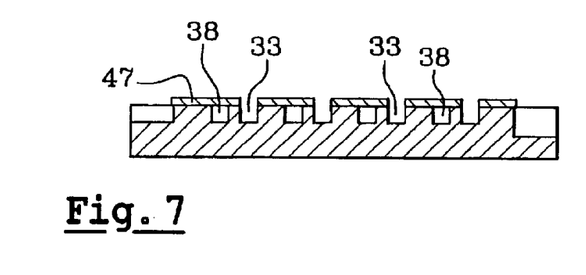
Figures 13, 14:
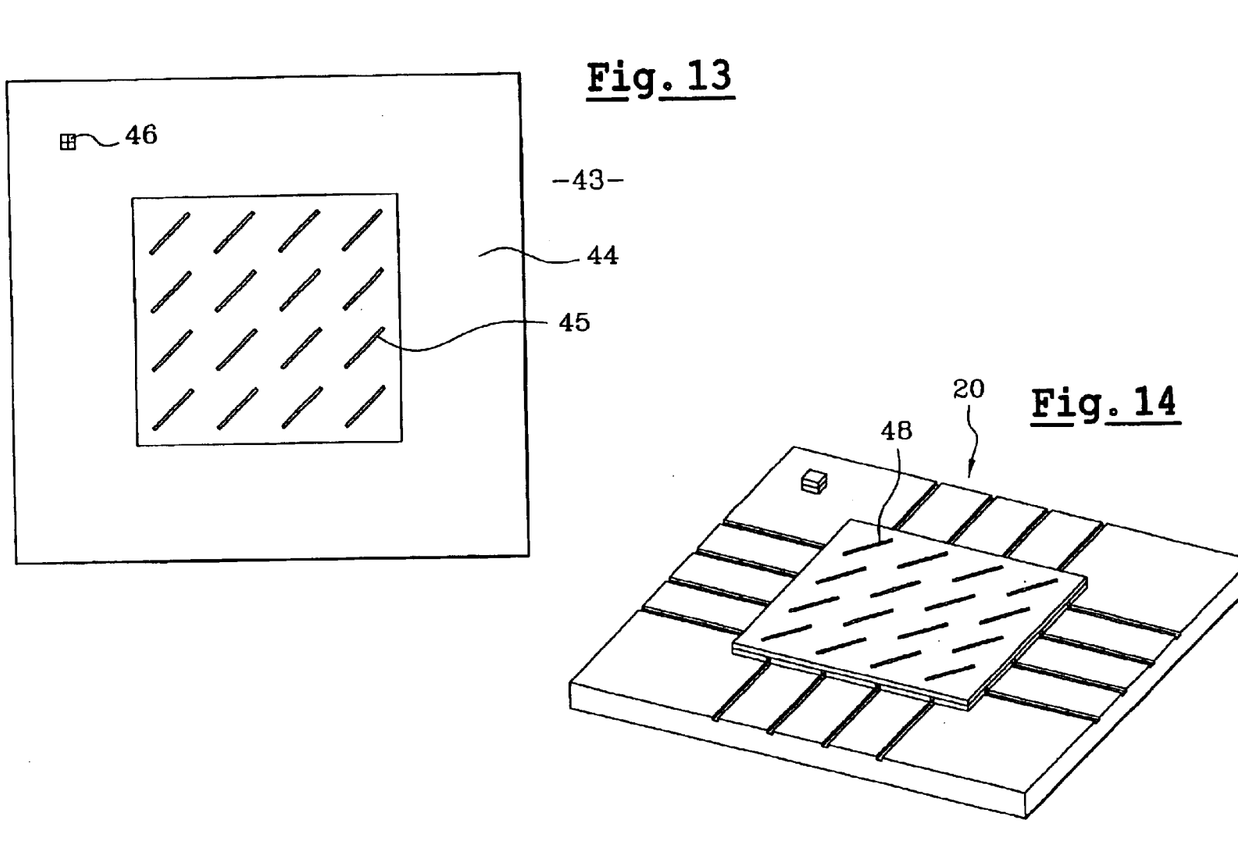
FIG. 13 illustrates the etching mask used to obtain the structure illustrated in summary perspective in FIG. 14.

Next, and as illustrated in FIG. 7, the third wafer (41) is etched, by means of the mask (43) illustrated in FIG. 13. Because of its peripheral zone (44), this mask (43) makes it possible to remove the peripheral part of the wafer (41), in the zones outside the overthickness zone (34). This mask (43) also comprises a set of patterns (45) corresponding to the various grooves (33) intended to receive the ends of the mirrors. The mask (43) also comprises a pattern (46) corresponding to the alignment pads (31). As such, and after etching, some portions of the third wafer (41) are removed in order to define the apertures (48) allowing the previously obtained grooves (33) to be opened out.

In a subsequent operation, the lid (20) thus obtained is put in place on top of the mirror matrix (1), by the "flip-chip" operations.

Figure 15:
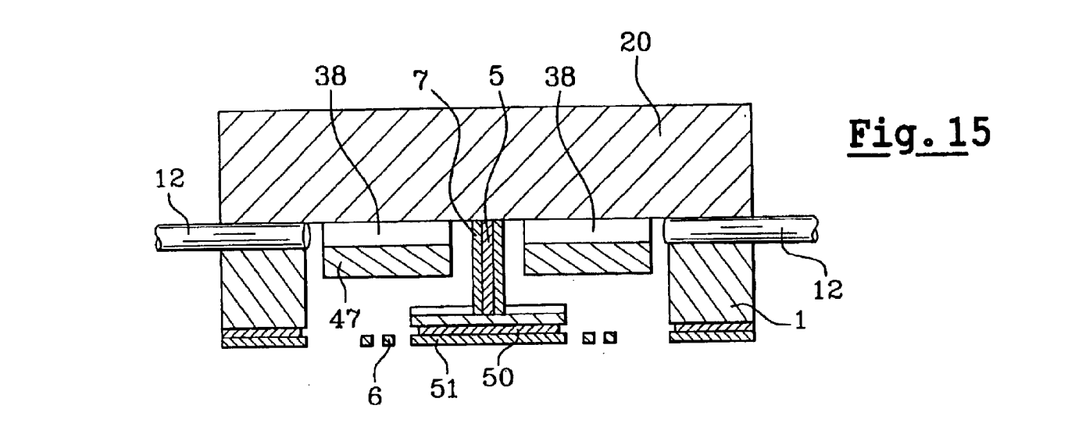
FIG. 15 is a sectional view illustrating one cell of the switching matrix.

The configuration obtained after assembly is illustrated in FIG. 15, for an elementary cell. In FIG. 15, the structure has been shown as if the matrix had only a single mirror, located between the portions receiving the optical fibers (12). Thus, the moveable structure (4) made from an SOI substrate, the insulating layer (50) of which makes it possible to define a thinner silicon layer (51) in the lower part, is observed, in which the deformable portions (6) connecting the moveable structure (4) to the fixed frame of the element (1) are produced. In the upper part, this moveable structure comprises the mirror (5) comprising two reflecting faces. On the lower face of the lid (20), the waveguides formed from the channels (38) and closed off by the layers (47) of the third wafer (41) can be observed.

It can be seen that virtually all the space located between the various mirrors, and between the mirrors (5) and the frame of the matrix (1), is taken up by the waveguides (38), such that the beams propagating within the matrix are guided over most of their path within the matrix.

Figure 16:
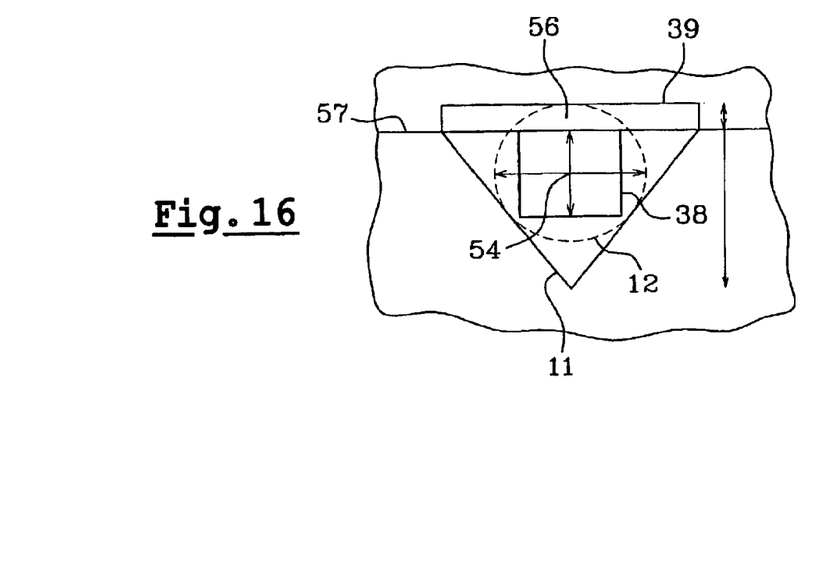
FIG. 16 is a detailed side view illustrating the shape of the housings into which the optical fibers are placed.

It will also be noted that said channels (38) of the waveguides are at the same level as the central portion of the optical fibers (12), as shown in the configuration illustrated in FIG. 16. Indeed, it can be observed in this figure that the optical fiber (12) has its center (54) at the level of the center of the channel (38). This therefore allows the beam coming from the core of the fiber to face the center of the channel of the waveguide, which favors its configuration with minimum reflection on the waveguide, therefore leading to minimum insertion losses.

Given the cylindrical geometry of the fibers (12), when the latter rests in the V-shaped groove (11), its upper part (56) overshoots the plane (57) by which the lid (20) rests on the frame (1). The portion (56) is therefore inserted into the groove (39) made for this purpose during the initial etching steps. Optimal dimensioning of these grooves (39) makes it possible to ensure that the fiber is locked within its housing, and in any event prevents the latter from moving too much.

Of course, the embodiment described hereinabove, relating to a 4×4 matrix, is in no way limiting, and the invention may of course have several versions for very large matrix sizes, which may reach several tens of cells per side.

It emerges from the foregoing that the switching matrix according to the invention has numerous advantages, among which mention may be made of:

- the fact that the light beams are routed over virtually all of their optical path inside continuous channels, with no interfaces between different materials, which prevents the appearance of reflection phenomena which generate losses in the conventional waveguide systems;
- the simultaneous production of the "inverted" waveguides and of the zones receiving the mirrors makes it possible to overcome a number of defects in alignment of the optical fibers with respect to the mirrors;
- the method of fabricating this matrix is relatively simple, since it only requires three masking levels in order to produce the lid, the lower part of which aims to fill the space located between the various mirrors.

What is claimed is:

1. An optical switching matrix, made from a semiconductor- or dielectric-based substrate, comprising:
    at least one set of optical input fibers (12) and at least one set of optical output fibers (14) oriented substantially perpendicular to each other,
    a set of moveable mirrors (5, 13) placed at the intersections of the directions defined by the various optical fibers, each mirror (13) being capable of moving in order to reflect a beam coming from an optical input fiber, bound for an optical output fiber,
    a set of channels defined between the mirrors, inside which the various beams are propagated before and after having encountered the mirrors,
in which:
    the set of mirrors is made on a first substrate wafer (2), said first wafer being covered with a second substrate wafer (20),
    the various channels (38) are formed between protruding zones (34) present under the second substrate wafer, said protruding zones comprising housings (33) inside which the moveable mirrors are able to move.

2. The optical switching matrix as claimed in claim 1, in which the wall of the channels furthest from the second substrate wafer (20) is made by a third substrate wafer (41), open in the zones (48) receiving the moveable mirrors.

3. The optical switching matrix as claimed in claim 1, in which the channels (38) have a rectangular, and preferably square, cross section.

4. The optical switching matrix as claimed in claim 1, in which the optical fibers and the associated collimating member are placed in housings (11, 39) partly formed in the first and the second substrate wafer.

5. A method of fabricating an optical switching matrix, made from a semiconductor- or dielectric-based substrate, comprising:
    at least one set of optical input fibers (12) and at least one set of optical output fibers (14) oriented substantially perpendicular to each other,
    a set of moveable mirrors (13) placed at the intersections of the directions defined by the various optical fibers, each mirror being capable of moving in order to reflect a beam coming from an optical input fiber, bound for an optical output fiber,
which comprises the steps consisting:
    on a first substrate wafer (2), in producing the set of moveable mirrors (13),
    on a second substrate wafer (21), designed to cover the first wafer, in defining an overthickness zone (34), of dimensions substantially less than those of the matrix of moveable mirrors,
    in producing on said overthickness zone (34):
        a set of channels (38) at the locations of the beams coming from and bound for the optical fibers,
        a set of diagonal grooves (33) at the locations of the moveable mirrors,
    in covering the second wafer with a third wafer (40), so as to close said channels defined on the overthickness zone,
    in producing apertures (48) in the third wafer in order to open out the diagonal grooves (33) formed in the overthickness zone (34),
    in covering the first wafer (2) with the assembly formed by the second (21) and the third (40) wafer, such that, between the mirrors (13), the beams coming from and bound for the optical fibers are routed in the channels (38) defined in the overthickness zone and that the mirrors are capable of entering the housings defined by the diagonal grooves (33).

6. The fabrication method as claimed in claim 5, in which, prior to or during the production of the overthickness zone (34), grooves (39) intended to form part of the housings receiving the optical fibers are defined on the second wafer, on the periphery of the overthickness zone.

7. The fabrication method as claimed in claim 5, in which, after putting the third wafer (40) in place on the second (21), the thickness of the third wafer is decreased.

* * * * *